Nov. 18, 1941.   A. WERME   2,263,527
FASTENING DEVICE AND PROCESS
Filed Feb. 9, 1940
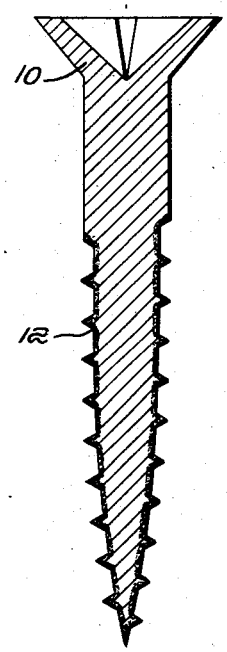
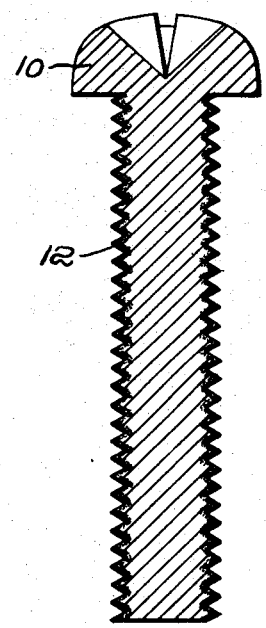

Patented Nov. 18, 1941

2,263,527

UNITED STATES PATENT OFFICE 2,263,527

FASTENING DEVICE AND PROCESS

Adolph Werme, Worcester, Mass., assignor to Reed & Prince Manufacturing Company, Worcester, Mass., a corporation of Massachusetts Application February 9, 1940, Serial No. 318,070

2 Claims. (Cl. 10—10)

The present invention relates to an improved fastening device and to a process for producing the same.

Difficulty has long been experienced in driving fastening devices such as case hardened screws without considerable damage to the driving tool or to the work which the screw enters. Sheet metal screws are commonly so hard that the driving tool cannot stand the repeated and constant shock of the hard head of the screw against the blade of the driver. For example, the case hardness of a sheet metal screw, measured on the Rockwell C scale, may be somewhat over 60, while the driving tool may have a hardness of 58 or lower. The attempt to drive a screw of a hardness greater than that of the driving tool has caused serious breakage of the drivers and damage to the work which the screw is entering.

This difficulty has been experienced with both the ordinary slotted screws and with the so-called recessed head screws and it is more serious in the case of the recessed head screws. Whereas an ordinary tool for driving slotted screws may be reground on the job, the tool used for driving recessed head screws is difficult to regrind, due to the nature and shape of the driver.

The present invention remedies this situation by providing a novel screw or fastening device, such as a sheet metal screw, with a case hardened shank or body but with a relatively softer head. It has been found that the relative softness of the head does not impair the efficiency of the screw, either by breaking off from the shank of the screw or by affecting the work into which the screw enters.

This desirable result I may obtain, for example, by a selective hardening treatment of the screw, such treatment being effective only on part of the screw, for example the body or thread, thus producing a case hardened screw with an unhardened or relatively softer portion such as the head.

As an example of the practice of my invention, the following is given, it being understood that this is by way of illustration only and is not to be construed in a limiting sense. After the heading process, screw blanks are coated with copper, for example by immersing them in a solution containing copper ions. The resulting copper plated blank next has a thread rolled or cut on the shank by the regular thread rolling or cutting process, familiar to those skilled in the art. In the present case, however, this rolling or cutting process not only forms the thread, but it also removes the copper coating from the shank of the screw blank, producing a screw with a copper plated head but with a clean shank. The screw is now subjected to a case hardening treatment, for example by immersion in a molten cyanide bath. The copper coating prevents or resists access and penetration of the cyanide into the head of the screw, while the rest of the screw receives the usual hardening treatment. Thus, after quenching, there is produced a screw with a hardened shank and a relatively softer or unhardened head.

Such screws are illustrated in the accompanying drawing, both of the figures being longitudinal sections through the center of the screw. Fig. 1 shows a wood screw and Fig. 2 a machine screw, both of the so-called "recessed head" type, Fig. 1 being a flat head screw and Fig. 2 a round head. In both figures the relatively softer head portions are indicated by the reference numeral 10. The hardening of the shank or thread portion is indicated by the numeral 12. The thickness of the hardened surface has been exaggerated in the drawing for purposes of illustration.

In place of the copper mentioned as a coating material in the above example, other plating or coating materials which will protect the head of the screw from the action of the hardening treatment, or will resist or impair the hardening, may be used, for example nickel, aluminum, chromium, clays with binders, such as fire clay and water glass, etc. In selecting the coating or plating material to be used, the hardening process contemplated will be kept in mind.

The protective coating may be applied to the screws or other articles by electroplating, dipping, spraying, or in any other convenient manner.

Various hardening treatments for metal are familiar to those skilled in the art. These treatments may, for example, involve the addition of carbon to furnish the hard surface (usually known as carburizing), the addition of nitrogen (usually known as nitriding), a combination of the above, the addition of other elements such as silicon, etc.

One treatment, mentioned in the above example, is to immerse the screw or other article to be hardened in a molten bath consisting of 10 to 50% sodium cyanide plus inert ingredients such as sodium chloride and sodium carbonate. The bath may be at a temperature of 1350 to 1700° F. The bath may be varied by the use of cyanates or by the addition of activators such as barium compounds, which hasten the absorption of the case. Immersion in this molten bath is continued until the desired thickness of case has been attained. The screws or other articles are then quenched in a cooling agent such for example as water or oil.

Among other familiar hardening treatments is the subjecting of the screws or other devices to be hardened to a heated hydrocarbon gas.

The thickness of case commonly used for sheet metal screws may vary from .002 inch for smaller sizes to .010 inch for larger sizes.

It is preferred to form the recess or slot in the screw in the heading operation, or at least prior to the coating with copper or equivalent substance, because sawing a slot in the head after copper plating would remove the protective copper coating and permit the subsequent hardening of the head of the screw.

Another means for confining the copper or other plating or coating material to a portion only, such as the head, of the screw or other fastening device, prior to immersion in the cyanide bath, is to apply to the shank of the screw, prior to the copper plating or coating, an agent, such as a lacquer, which will prevent the deposit of copper or other coating material on the shank. Now upon immersing the screw in the copper or other solution, the copper will be deposited only on the head of the screw.

Yet another method of producing my improved screw, which does not necessarily involve plating or coating of the screw, is to subject the screw to the hardening bath or like treatment in the usual manner and then, before quenching, to shave the head of the screw. Thereafter, the screw may be reheated and quenched. The shaving operation will remove from the head of the screw the surface metal which was penetrated by the hardening bath, so that upon quenching only the shank will be hardened.

It will thus be seen that I have produced a novel and improved screw which has a relatively hard shank portion and a relatively softer head. The shank or thread will have a carburized case, while the head will be substantially uncarburized. The shank will in general be sufficiently hard to cut a thread in low carbon steel. The hardening agent may reach the metal of the head to some extent, as through interstices in the copper or other protective coating, resulting in some carburization of the metal of the head, but the head, if carburized, will be carburized to a lesser extent than the shank.

In come cases it may be desired to make another portion, such as the shank of the screw or other fastening device, instead of the head, relatively softer. In this case the material resistant to the hardening treatment may be applied only to the shank, or may be coated on the entire screw and removed from the head prior to the hardening treatment, as mentioned above, etc.

By way of example, the head of the screw may have a hardness, measured on the Rockwell B scale, of 100 or less, for example 70 to 90. The thread or shank may have a case hardness, measured on the Rockwell C scale, greater than 45, for example in the neighborhood of 60.

Determination of the hardness of metals on the Rockwell scale is familiar to those skilled in the art and does not require any description in this specification.

It should be noted that if the hardened casing of the screw is too thin for measurement on the ordinary Rockwell scale, the hardness may be measured with the superficial Rockwell scale or with a Vickers scale.

I claim:

1. An integral, one-piece screw comprising a shank portion and a slotted or socketed head portion, the shank portion having a case hardened thread and the head portion being substantially unhardened.

2. In a method for making a screw, the steps which comprise coating both the head portion and the shank portion of the screw, prior to formation of a thread thereon, with a material resistant to hardening treatment, then forming a thread on the shank portion of the screw and thereby removing said coating from the shank while leaving said coating on the head portion, then subjecting the screw to a hardening treatment whereby the surface of the shank portion only is selectively hardened.

ADOLPH WERME.